United States Patent [19]
Thornburgh

[11] 3,892,026
[45] July 1, 1975

[54] METHOD OF MANUFACTURING AN INTAKE MANIFOLD FOR EXHAUST GAS RECIRCULATION

[75] Inventor: William F. Thornburgh, Rochester, Mich.

[73] Assignee: General Motors Corporation, Detroit, Mich.

[22] Filed: Oct. 13, 1972

[21] Appl. No.: 297,496

Related U.S. Application Data

[60] Division of Ser. No. 189,345, Oct. 14, 1971, Pat. No. 3,717,130, which is a continuation-in-part of Ser. No. 43,537, June 4, 1970, abandoned.

[52] U.S. Cl............ 29/156.4 R; 29/DIG. 26; 408/1
[51] Int. Cl.......................................... B23p 13/02
[58] Field of Search..... 29/156.4 R, DIG. 26, 527.6; 123/52 MV, 119 A, 122 AB; 408/1

[56] References Cited
UNITED STATES PATENTS

| | | | |
|---|---|---|---|
| 1,336,800 | 4/1920 | Vincent | 29/DIG. 26 |
| 1,841,453 | 1/1932 | Rigby | 29/DIG. 26 |
| 2,147,243 | 2/1939 | Cornell, Jr. | 29/DIG. 26 |
| 2,364,305 | 12/1944 | Martin | 29/157.1 R |
| 2,364,864 | 12/1944 | Martin | 29/157.1 R |
| 2,640,471 | 6/1953 | Haltenberger | 29/156.4 R |
| 2,651,507 | 9/1953 | Heinecke | 123/122 AB |
| 2,936,746 | 5/1960 | Rundquist | 123/52 MV |
| 3,237,615 | 3/1966 | Daigh | 123/119 A |

Primary Examiner—C. W. Lanham
Assistant Examiner—Dan C. Crane
Attorney, Agent, or Firm—C. K. Veenstra

[57] ABSTRACT

In an internal combustion engine, exhaust gas is recirculated from the intake manifold exhaust gas crossover passage to the induction passages. The exhaust gas recirculation passage is cast integrally in the intake manifold structure, extending from the exhaust crossover passage to a recirculation control valve and then to the induction passages. The opening from the recirculation passage to the induction passage is formed by a machining tool extending parallel to the induction passage wall.

5 Claims, 12 Drawing Figures

3,892,026

METHOD OF MANUFACTURING AN INTAKE MANIFOLD FOR EXHAUST GAS RECIRCULATION

This application is a Division of Ser. No. 189,345, filed Oct. 14, 1971, now U.S. Pat. No. 3,717,130, which is a continuation-in-part of Ser. No. 43,537, filed June 4, 1970, and now abandoned.

This invention provides a method of manufacturing an intake manifold having induction, exhaust gas crossover, and exhaust gas recirculation passages cast in an integral unit. The exhaust gas flowing through the crossover passage appropriately heats the induction passages, and exhaust gas drawn from the crossover passage through the recirculation passage is metered by a control valve and properly introduced into the induction passages. At least one of the ports interconnecting the recirculation and induction passages if formed by a tool extending parallel to and removing a portion of the induction passage wall.

The details as well as other objects and advantages of this invention are set forth below and shown by the drawings wherein.

Figure 1:
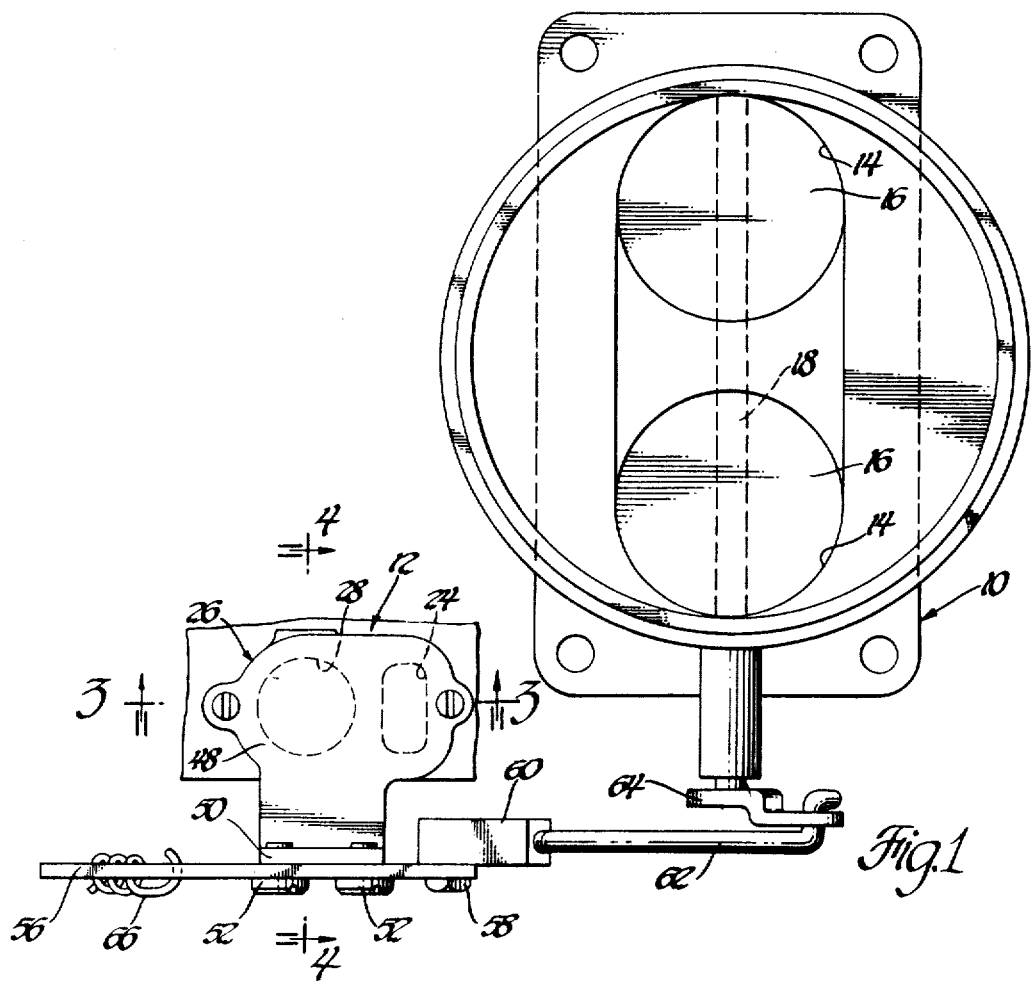
FIG. 1 is a top plan view of an induction passage throttle body and an exhaust gas recirculation control valve assembly.
Figure 2:
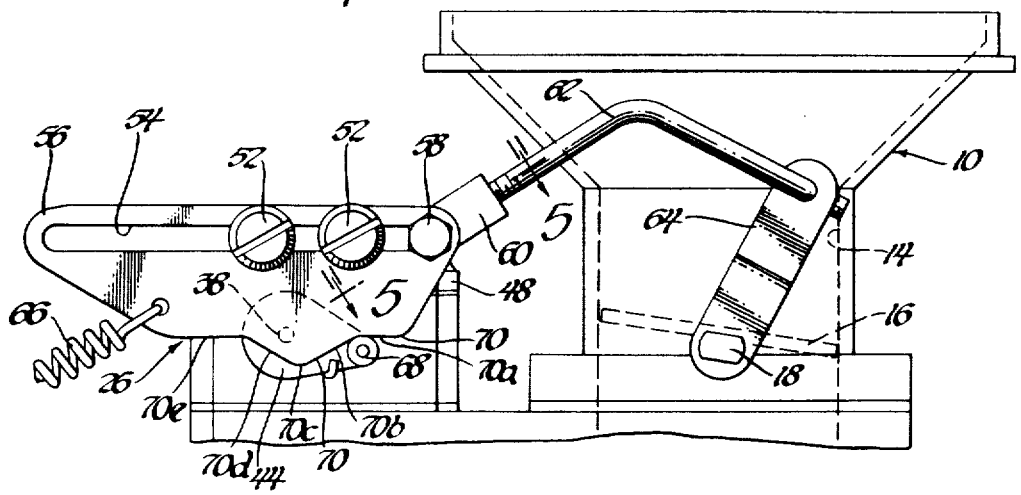
FIG. 2 is a side elevational view of the devices shown in FIG. 1 illustrating a cam member which may be used to position the valve.

Referring first to FIGS. 1 and 2, a throttle body assembly 10 is mounted on an intake manifold 12 and has a pair of induction passages 14 controlled by a pair of throttles 16 disposed on a throttle shaft 18.

An exhaust gas recirculation inlet passage 24 leads to an exhaust gas recirculation control valve assembly 26 and an exhaust gas recirculation outlet passage 28 leads from control valve assembly 26. For simplicity, exhaust gas recirculation inlet passage 24 will be referred to merely as exhaust gas recirculation passage 24, exhaust gas recirculation outlet passage 28 will be referred to as metered exhaust gas passage 28, and the two passages 24 and 28 will be referred to collectively as an exhaust gas recirculation passage.

Figure 3:
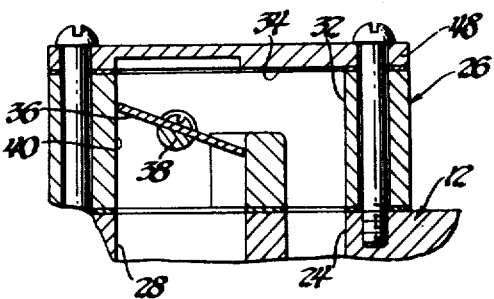
FIG. 3 is a sectional view taken along line 3—3 of FIG. 1 illustrating the valve.

As shown in FIG. 3, exhaust gas recirculation control valve assembly 26 has an inlet bore 32 leading from exhaust gas recirculation passage 24 to an upper cross passage 34. A butterfly valve 36 is disposed on a shaft 38 in an outlet bore 40 leading from cross passage 34 to metered exhaust gas passage 28.

Figure 4:
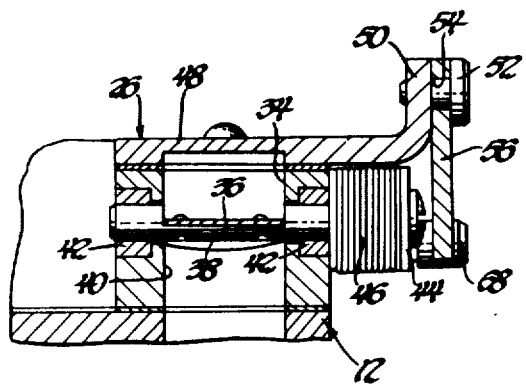
FIG. 4 is a sectional view along line 4—4 of FIG. 1 illustrating the valve operating mechanism.
Figure 5:
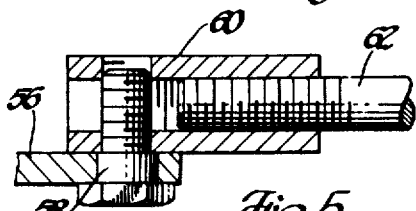
FIG. 5 is a sectional view alone line 5—5 of FIG. 2 illustrating the adjustable connection in the linkage between the valve and the throttle.

Shaft 38 is journalled on a pair of bushings 42 (FIG. 4) and has a lever 44 (FIGS. 2 and 4) secured on the outer end thereof. A torsion spring 46 (FIG. 4) biases shaft 38 and lever 44 in a counterclockwise direction as viewed in FIG. 2.

The cover 48 for control valve assembly 26 provides a bracket having an upstanding arm 50 (FIGS. 1 and 4) into which a pair of bolts 52 are threadedly secured. As shown in FIG. 2, bolts 52 extend through a slot 54 in a cam member 56, thereby supporting cam member 56 for linear motion.

An additional bolt 58 also extends through slot 54 and is secured to an adjusting nut 60. Adjusting nut 60 threadedly receives a link 62 connected to a throttle lever 64 secured on throttle shaft 18.

A spring 66 biases cam member 56 leftwardly as viewed in FIGS. 1 and 2.

In operation, clockwise opening movement of throttles 16, throttle shaft 18 and throttle lever 64 pulls link 62 and cam member 56 toward the right as viewed in FIG. 2. A cam follower 68 on control valve lever 44 is biased against a cam surface 70 on cam member 56. As is evident from FIG. 2, cam follower 68 successively contacts a first portion 70a in which valve 36 remains closed, a first ramp 70b in which valve 36 opens, a peak 70c in which valve 36 remains open, a second ramp 70d in which valve 36 closes, and a second portion 70e in which valve 36 remains closed. The sequence is reversed as throttles 16 are closed and spring 66 returns cam member 56 toward the left.

Cam surface 70 is configured whereby valve 36 begins opening movement when throttles 16 have been opened about 5°, reaches a fully open position when throttles 16 have been opened between 14° and 20°, and returns to closed position when throttles 16 have been opened about 34°.

As valve 36 opens, exhaust gas received through exhaust gas recirculation passage 24 is admitted to metered exhaust passage 28 and is delivered to induction passages 14.

Figure 6:
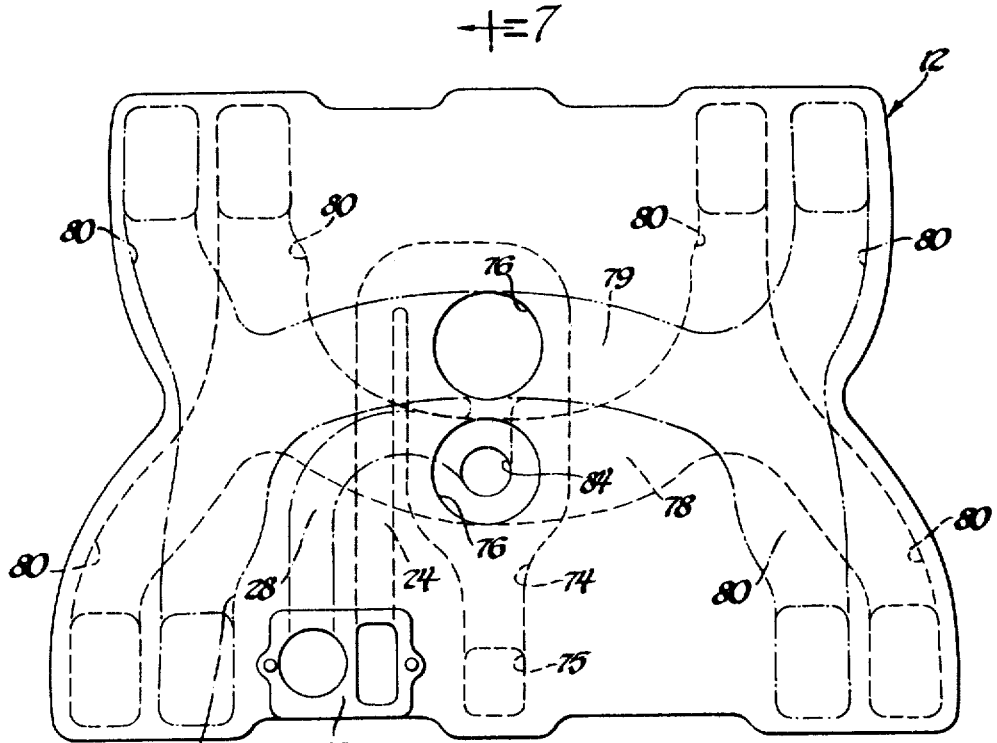
FIG. 6 is a top plan view of the FIG. 1 intake manifold having an integrally cast exhaust gas recirculation passage.
Figure 7:
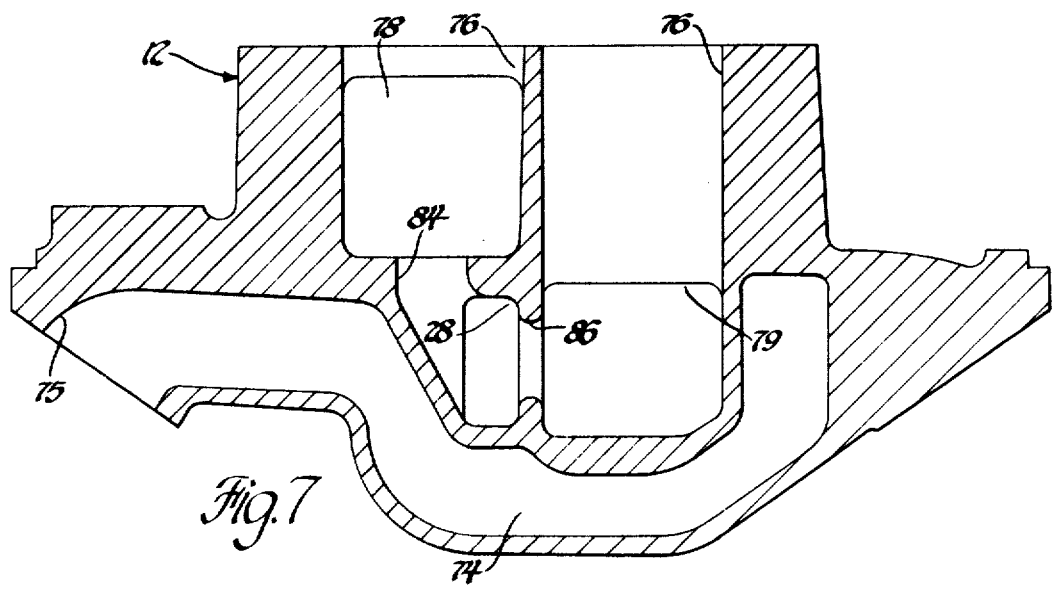
FIG. 7 is a sectional view taken along line 7—7 of FIG. 6 illustrating the openings from the exhaust gas recirculation passage to the induction passages.

FIGS. 6 and 7 show one embodiment of an intake manifold 12 in which exhaust gas recirculation passage 24 and metered exhaust gas passage 28 are cast integrally in the manifold. The FIG. 6 view in schematic and various combination of dot-dash lines have been used to facilitate visualization of the different passages. As shown in these figures, a pair of riser passages 76 disposed on opposite sides of the manifold center line and aligned with induction passages 14 in throttle body 10 connect with upper and lower plenum chambers 78 and 79, respectively, which are generally horizontal and extend longitudinally through the manifold to transversely reaching runner passages 80.

It will be appreciated, of course, that throttle body induction passages 14 and intake manifold riser passages 76, plenum chambers 79 and 78, and runner passages 80 may be collectively referred to as induction passages.

An exhaust gas crossover passage 74 extends from an inlet 75 at one side of the manifold center line, under plenum chambers 78 and 79 below riser passages 76, to the opposite side of the manifold center line. There exhaust gas crossover passage 74 discharges into exhaust gas recirculation passage 24. Passage 24 leads below plenum chambers 78 and 79 to a pad 82 which is adapted to receive a control valve assembly such as one of those shown in FIGS. 1 through 5 or 12. Alternatively, an exhaust gas recirculation control valve assembly of different design could be received in a pocket in manifold 12. Metered exhaust gas passage 28 extends from pad 82, above exhaust gas recirculation passage 24, above exhaust gas crossover passage 74, and under upper plenum chamber 78 to a pair of ports 84 and 86. Port 84 opens vertically into the bottom of upper plenum chamber 78 and is centered below the associated riser passage 76. Port 86 opens horizontally into lower plenum chamber 79. Thus, exhaust gas is recirculated through a crossover passage to heat the induction passages and is then delivered through a control valve assembly for recirculation into the induction passages.

Figure 8:
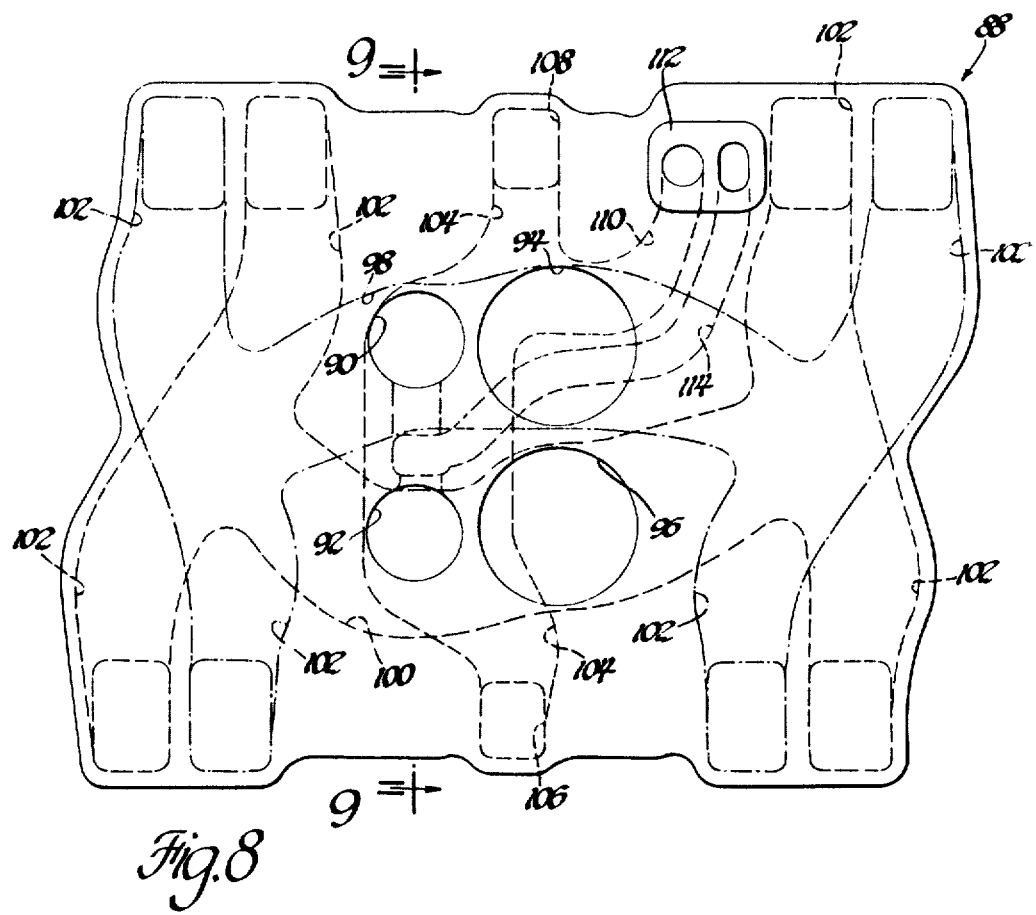
FIG. 8 is a top plan view of an alternative intake manifold having the openings from the exhaust gas recirculation passage into the induction passages formed and arranged in a different manner.
Figure 9:
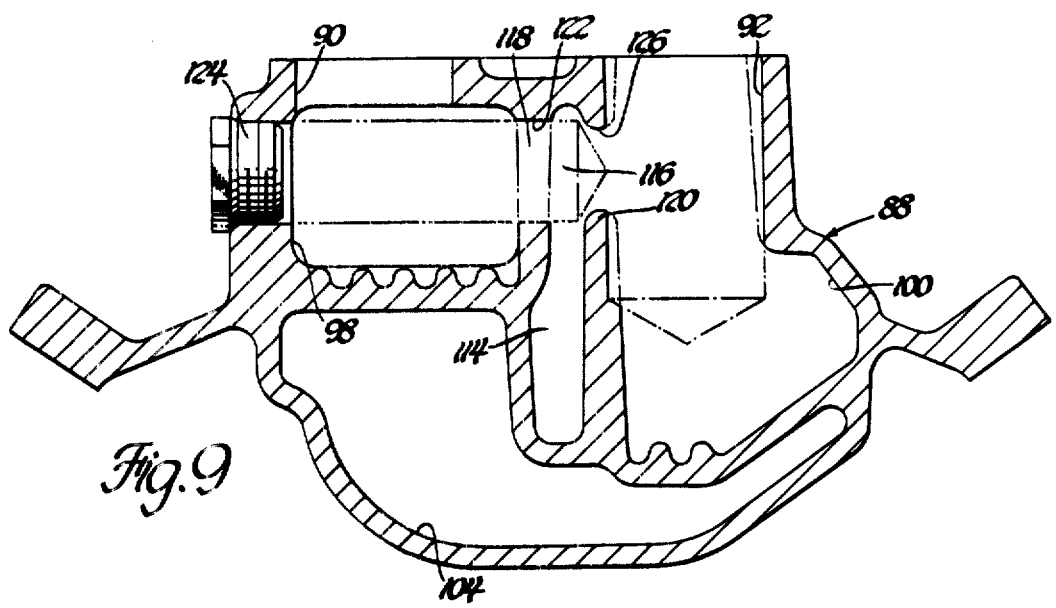
FIG. 9 is a sectional view along line 9—9 of FIG. 8 showing the location and method of forming the openings.

FIGS. 8 and 9 show another embodiment of an intake manifold in which the exhaust gas recirculation passage and the metered exhaust gas passage also are cast integrally in the manifold. As shown in these figures, this manifold 88 has a pair of primary riser passages 90 and 92 and a pair of secondary riser passages 94 and 96. Riser passages 90 and 94 connect with an upper plenum chamber 98 and riser passages 92 and 96 connect with a lower plenum chamber 100, plenum chambers 98 and 100 being generally horizontal and extending longitudinally through the manifold to transversely reaching runner passages 102. An exhaust gas crossover passage 104 extends transversely under plenum chambers 98 and 100, below primary riser passages 90 and 92, from an inlet port 106 to an outlet port 108.

An exhaust gas recirculation passage 110 leads from exhaust gas crossover passage 104 to a pad 112 which is adapted to receive a control valve assembly such as one of those shown in FIGS. 1 through 5 or 12. Alternatively, an exhaust gas recirculation control valve assembly of different design could be received in a pocket in manifold 88. A metered exhaust gas passage 114 extends from pad 112, under upper plenum chamber 98, and above exhaust gas crossover passage 104 to an area 116 disposed between upper plenum chamber 98 and riser passage 92.

Referring to FIG. 9, when manifold 88 is cast, area 116 is separated from upper plenum chamber 98 by a plenum wall 118 and at least partially separated from riser 92 by a riser wall 120. A port 122 is then formed through plenum wall 118 by extending a machining tool horizontally through upper plenum chamber 98 to form an opening in plenum wall 118. After machining, a plug 124 seals the outer wall of the manifold. A port 126 is formed in riser wall 120 by a machining tool extended vertically into riser 92. The machining operations provide accurately sized openings or ports 122 and 126 to permit an appropriate flow of recirculated exhaust gas from the exhaust gas recirculation passage into the induction passages, port 126 being formed simultaneously with machining of riser 92.

Figure 10:
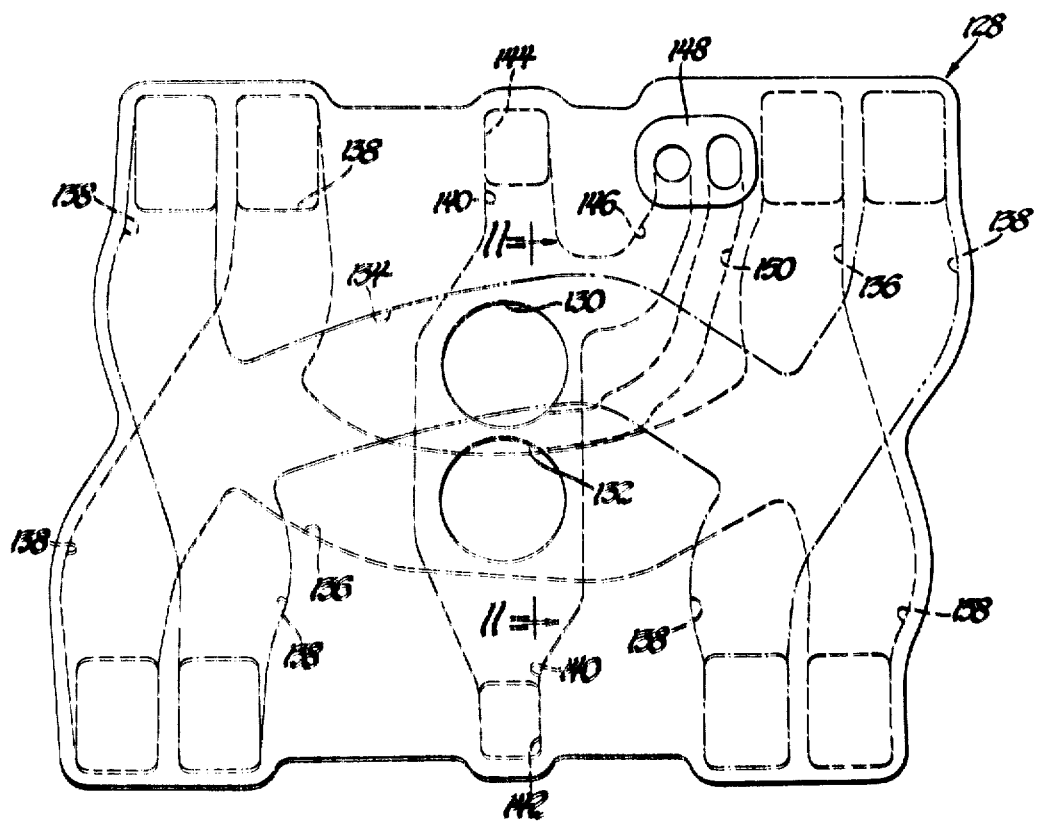
FIG. 10 is a top plan view of another alternative intake manifold having the openings from the exhaust gas recirculation passage into the induction passages formed in yet another manner.
Figure 11:
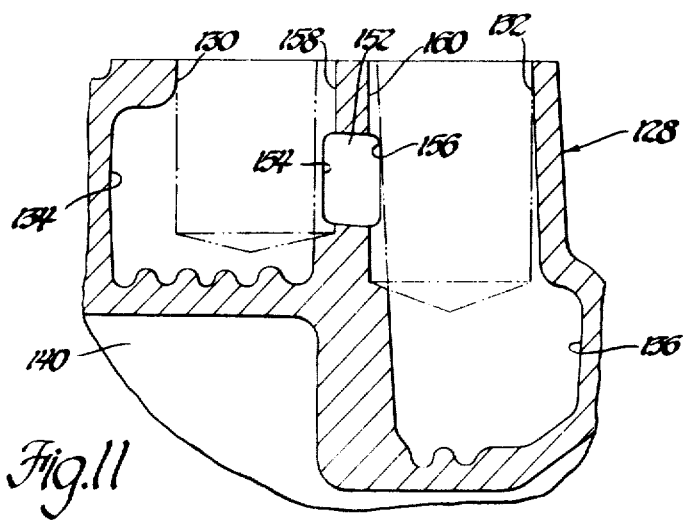
FIG. 11 is a sectional view along line 11—11 of FIG. 10 showing the location and method of forming the openings.

FIGS. 10 and 11 show yet another embodiment of an intake manifold in which the exhaust gas recirculation passage and the metered exhaust gas passage are cast integrally in the manifold. As shown in these figures, this manifold 128 has a pair of riser passages 130 and 132 which connect with upper and lower plenum chambers 134 and 136, respectively. Plenum chambers 134 and 136 are generally horizontal and extend longitudinally through the manifold to transversely reaching runner passages 138.

An exhaust gas crossover passage 140 extends under the plenum chambers 134 and 136, below risers 130 and 132, from an inlet port 142 to outlet port 144.

An exhaust gas recirculation passage 146 extends from exhaust gas crossover passage 140 to a pad 148 which is adapted to receive a control valve assembly such as one of those shown in FIGS. 1 through 5 or 12. Alternatively, an exhaust gas recirculation control valve assembly of different design could be received in a pocket of manifold 128. A metered exhaust gas passage 150 extends from pad 148 under upper plenum chamber 134 and above exhaust gas crossover passage 140 to an area 152 between upper plenum chamber 134 and riser 132. A pair of ports 154 and 156 deliver exhaust gas from area 152 into upper plenum chamber 134 and riser 132, respectively. Port 154 is formed and riser 130 is finished by a machining tool brought vertically through riser passage 130 into plenum 132 to remove a portion of the riser and plenum wall 158, and port 156 is formed and riser 132 is finished by a machining tool brought vertically into riser 132 to remove a portion of the riser wall 160.

Figure 12:
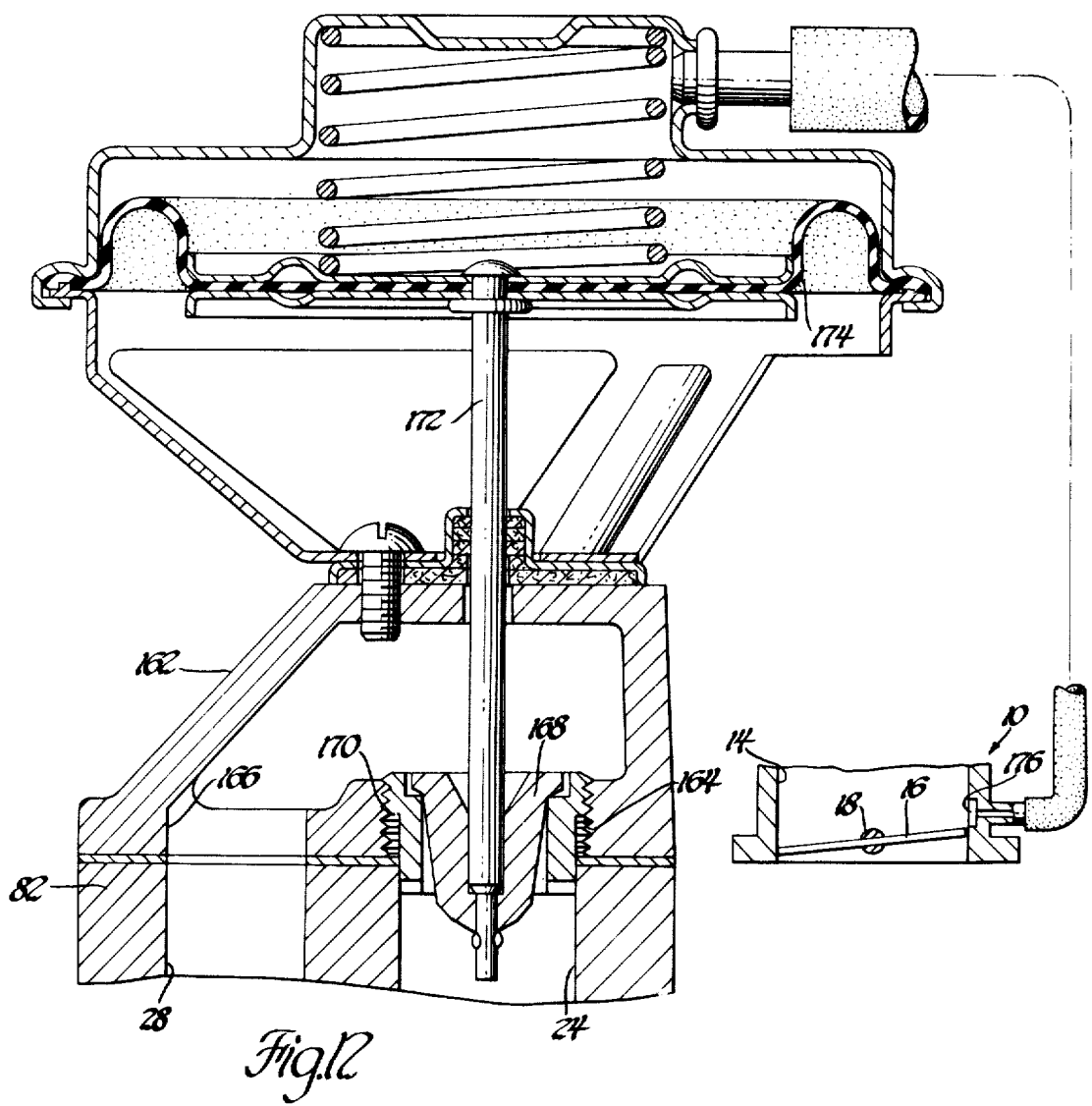
FIG. 12 is an enlarged sectional view in elevation of an alternative exhaust gas recirculation control valve assembly.

FIG. 12 shows an alternative embodiment of an exhaust gas recirculation control valve assembly which may be used in place of control valve assembly 26 on any of the disclosed manifolds. It comprises a valve body 162 adapted to be received on pad 82, 112, or 148 of manifold 12, 88, or 128. Valve body 162 has an inlet 164 which registers with exhaust gas recirculation passage 24, 110, or 146 and a metered exhaust outlet 166 which registers with metered exhaust passage 28, 114, or 150. A valve pintle 168 controls flow through a valve seat 170 adjustably mounted in inlet 164. Pintle 168 is positioned by a stem 172 operated by a diaphragm 174 which is responsive to the vacuum signal created at a port 176 disposed adjacent the throttle 16 in one of the induction passages 14.

It will be appreciated that each of the foregoing manifolds advantageously incorporates an exhaust gas recirculation passage and means for receiving a control valve assembly in a novel manner which is substantially easier to manufacture than prior art structures. Further, the manifold embodiments of FIGS. 8 through 11 include the additionally novel port structure formed by machining operations which may be combined with machining operations usually conducted on other intake manifolds.

What is claimed is:

1. The method of manufacturing an intake manifold for supplying air and exhaust gas to an internal combustion engine comprising casting a manifold having an induction passage including a riser passage and having a metered exhaust passage extending to an area adjacent said induction passage, said area being at least partially separated from said induction passage by a portion of an induction passage wall, and extending a machining tool into said riser passage along an axis parallel to said portion of said induction passage wall and thereby simultaneously machining said riser passage and removing said portion of said induction passage wall to provide a finished riser passage and to provide an opening from said area into said induction passage through said induction passage wall.

2. The method of manufacturing an intake manifold for supplying air and exhaust gas to an internal combustion engine comprising casting a manifold having a riser passage extending to a plenum chamber and having a metered exhaust passage extending to an area adjacent said plenum chamber, said area being at least partially separated from said plenum chamber by a portion of a plenum wall, and extending a machining tool through said riser passage into said plenum chamber along an axis parallel to said portion of said plenum wall and thereby simultaneously machining said riser passage and removing said portion of said plenum wall to provide a finished riser passage and to provide an opening from said area into said plenum chamber through said plenum wall.

3. The method of manufacturing an intake manifold for supplying air and exhaust gas to an internal combustion engine comprising casting a manifold having a riser passage extending to a plenum chamber and having a metered exhaust passage extending to an area adjacent said riser passage, said area being at least partially separated from said riser passage by a portion of a riser wall, and extending a machining tool into said riser passage along an axis parallel to said portion of said riser wall and thereby simultaneously machining said riser passage and removing said portion of said riser wall to provide a finished riser passage to provide an opening from said area into said riser passage through said riser wall.

4. The method of manufacturing a bi-level intake manifold for supplying air and exhaust gas to a V-8 type internal combustion engine having combustion chambers disposed along opposite sides of a longitudinal center line, said method comprising casting a manifold having a pair of generally vertical riser passages transversely spaced on opposite sides of said center line, an upper generally horizontal plenum chamber extending longitudinally from the bottom of one of said riser passages, a lower generally horizontal plenum chamber extending longitudinally from the bottom of the other of said riser passages and extending beneath said upper plenum chamber at the ends thereof, runner passages extending transversely from the ends of said plenum chambers, an exhaust gas crossover passage extending transversely under and in heat exchange relation with said plenum chambers below said riser passages, an exhaust gas recirculation passage extending from said exhaust gas crossover passage to means for receiving an exhaust gas recirculation control valve adapted to meter the flow of exhaust gas through said exhaust gas recirculation passage, and a metered exhaust gas passage extending from said valve receiving means under said upper plenum chamber and above said exhaust gas crossover passage to an area disposed between said upper plenum chamber and said other riser passage, said area being at least partially separated from said upper plenum chamber and said other riser passage by portions of plenum and riser walls respectively, extending a machining tool generally horizontally through said upper plenum chamber and thereby removing said portion of said plenum wall to provide an opening extending generally horizontally from said area into said upper plenum chamber through said plenum wall, and extending a machining tool generally vertically into said other riser passage and thereby simultaneously machining said riser passage and removing said portion of said riser wall to provide a finished riser passage and to provide an opening extending generally horizontally from said area into said other riser passage through said riser wall.

5. The method of manufacturing a bi-level intake manifold for supplying air and exhaust gas to a V-8 type internal combustion engine having combustion chambers disposed along opposite sides of a longitudinal center line, said method comprising casting a manifold having a pair of generally vertical riser passages transversely spaced on opposite sides of said center line, an upper generally horizontal plenum chamber extending longitudinally from the bottom of one of said riser passages, a lower generally horizontal plenum chamber extending longitudinally from the bottom of the other of said riser passages and extending beneath said upper plenum chamber at the ends thereof, runner passages extending tansversely from the ends of said plenum chambers, an exhaust gas crossover passage extending transversely under and in heat exchange relation with said plenum chambers below said riser passages, an exhaust gas recirculation passage extending from said exhaust gas crossover passage to means for receiving an exhaust gas recirculation control valve adapted to meter the flow of exhaust gas through said exhaust gas recirculation passage, and a metered exhaust gas passage extending from said valve receiving means under said upper plenum chamber and above said exhaust gas crossover passage to an area disposed between said upper plenum chamber and said other riser passage, said area being at least partially separated from said upper plenum chamber and said other riser passage by portions of plenum and riser walls respectively, extending a machining tool generally vertically through said one riser passage into said upper plenum chamber and thereby simultaneously machining said one riser passage and removing said portion of said plenum wall to finish said one riser passage and to provide an opening extending generally horizontally from said area into said upper plenum chamber through said plenum wall, and extending a machining tool generally vertically into said other riser passage and thereby simultaneously machining said other riser passage and removing said portion of said riser wall to finish said other riser passage and to provide an opening extending generally horizontally from said area into said other riser passage through said riser wall.

* * * * *